United States Patent [19]

Hattori et al.

[11] 4,156,037

[45] May 22, 1979

[54] PROCESS FOR PRODUCING A MAGNETIC RECORDING MEDIUM

[75] Inventors: Seizi Hattori, Ibaragi; Takehiko Nakagawa, Kawasaki; Kazuo Kobayashi, Ayasemachi; Koichi Makino, Yokohama; Wakatake Matsuda, Zama, all of Japan

[73] Assignees: Fujitsu Limited; Nippon Telegraph & Telephone Public Corporation, both of Japan

[21] Appl. No.: 773,963

[22] Filed: Mar. 3, 1977

[30] Foreign Application Priority Data

Mar. 16, 1976 [JP] Japan .................................. 51/27679
Mar. 16, 1976 [JP] Japan .................................. 51/27680

[51] Int. Cl.$^2$ ........................ G11B 5/84; C04B 35/26; C01G 49/08
[52] U.S. Cl. .................................... 427/130; 427/132; 252/62.55; 252/62.56; 252/62.6
[58] Field of Search ................ 252/62.55, 62.56, 62.6; 423/632, 636; 427/127, 132, 128, 130

[56] References Cited

U.S. PATENT DOCUMENTS

| | | | |
|---|---|---|---|
| 3,075,919 | 1/1963 | Gruber et al. | 423/634 X |
| 3,795,542 | 3/1974 | Halaby et al. | 423/634 X |
| 3,903,004 | 9/1975 | Matsumoto et al. | 252/62.6 X |
| 3,912,646 | 10/1975 | Leitner et al. | 423/634 X |
| 4,032,674 | 6/1977 | Hirabayashi et al. | 252/62.55 X |

*Primary Examiner*—Jack Cooper
*Attorney, Agent, or Firm*—Staas & Halsey

[57] ABSTRACT

A thin film of ferrite for use as a magnetic recording medium contain (a) Cu, (b) both Cu and Co, or (c) Cu, Co and Nb. The inclusion of Cu increases the temperature range for reduction from $\alpha$-$Fe_2O_3$ to one of the ferrites, i.e. $Fe_3O_4$, and also lowers the above-mentioned reducting temperature. The addition of Co improves the magnetic properties of the ferrite. The simultaneous addition of Cu, Co and Nb provides $\gamma$-$Fe_2O_3$ with excellent magnetic properties, which are stable over wide temperature range for oxidizing the $Fe_3O_4$ to the $\gamma$-$Fe_2O_3$.

38 Claims, 11 Drawing Figures

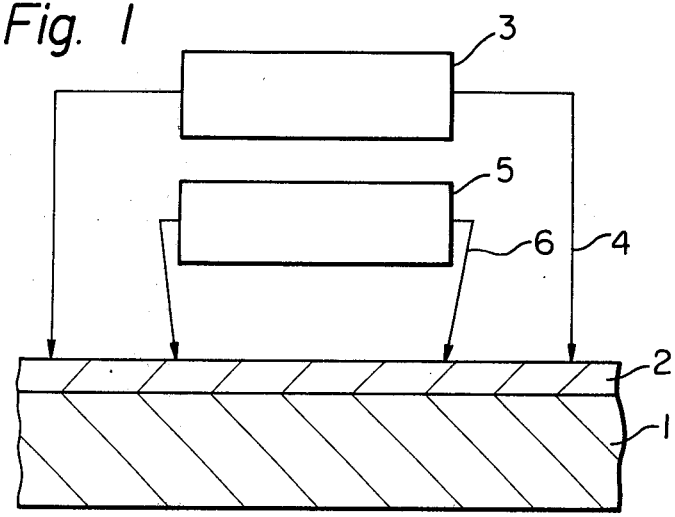
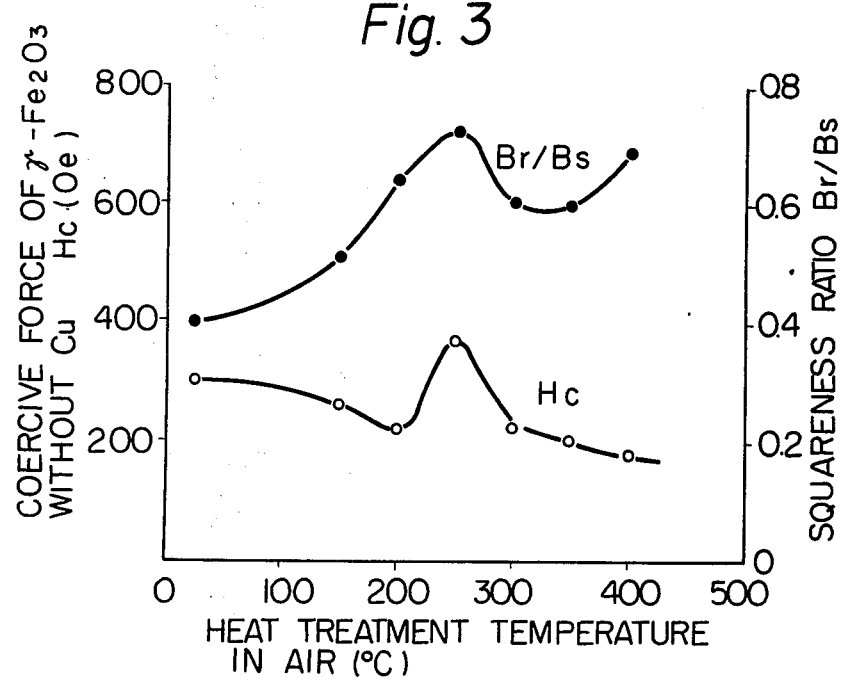

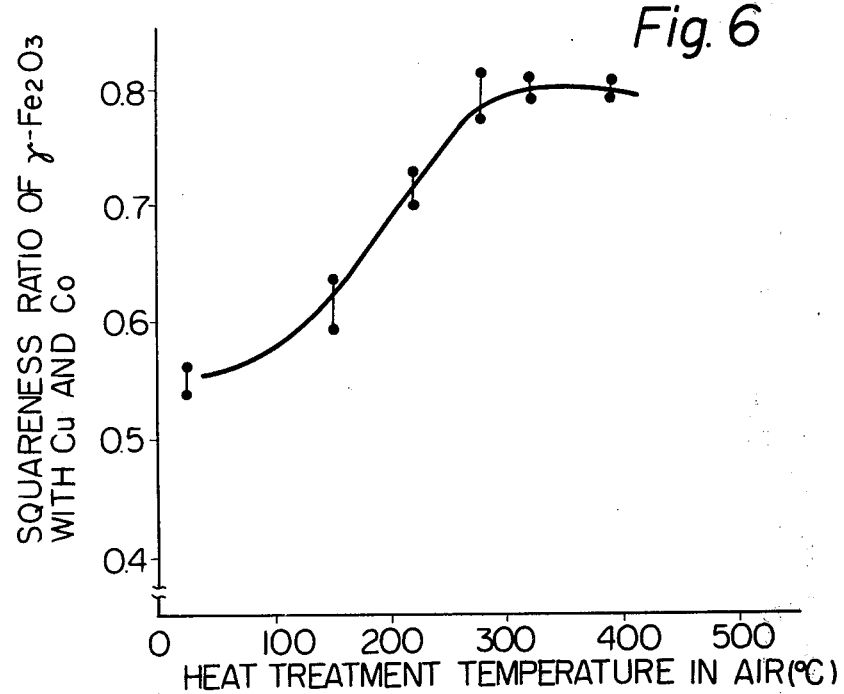
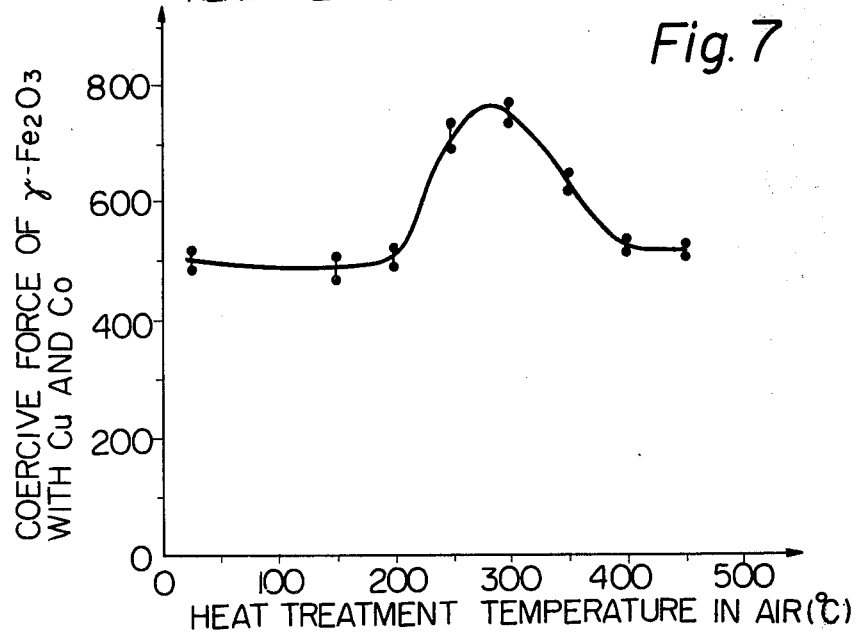

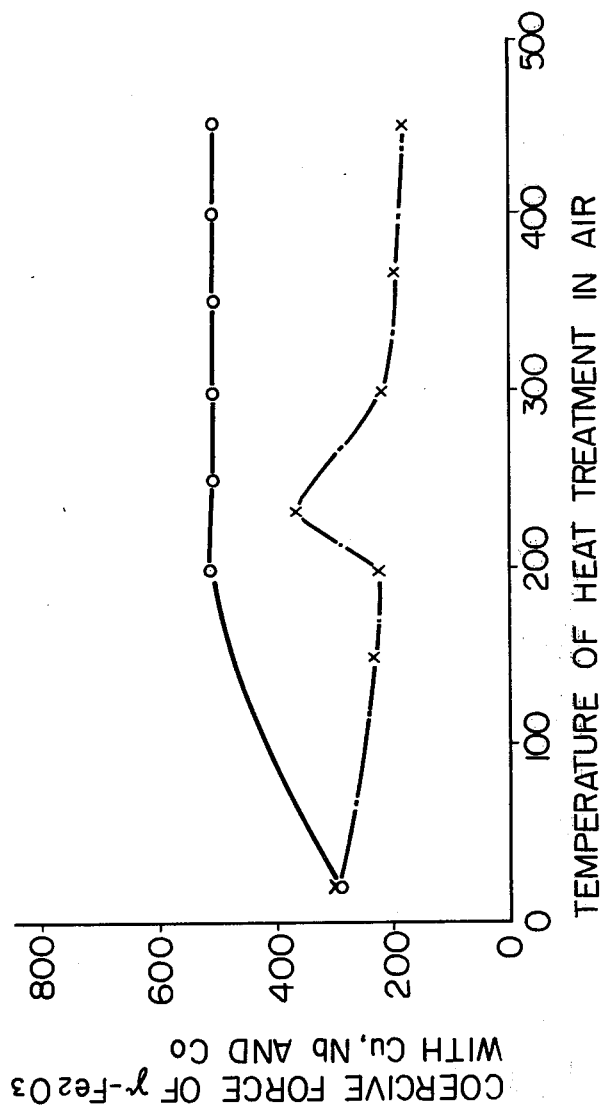

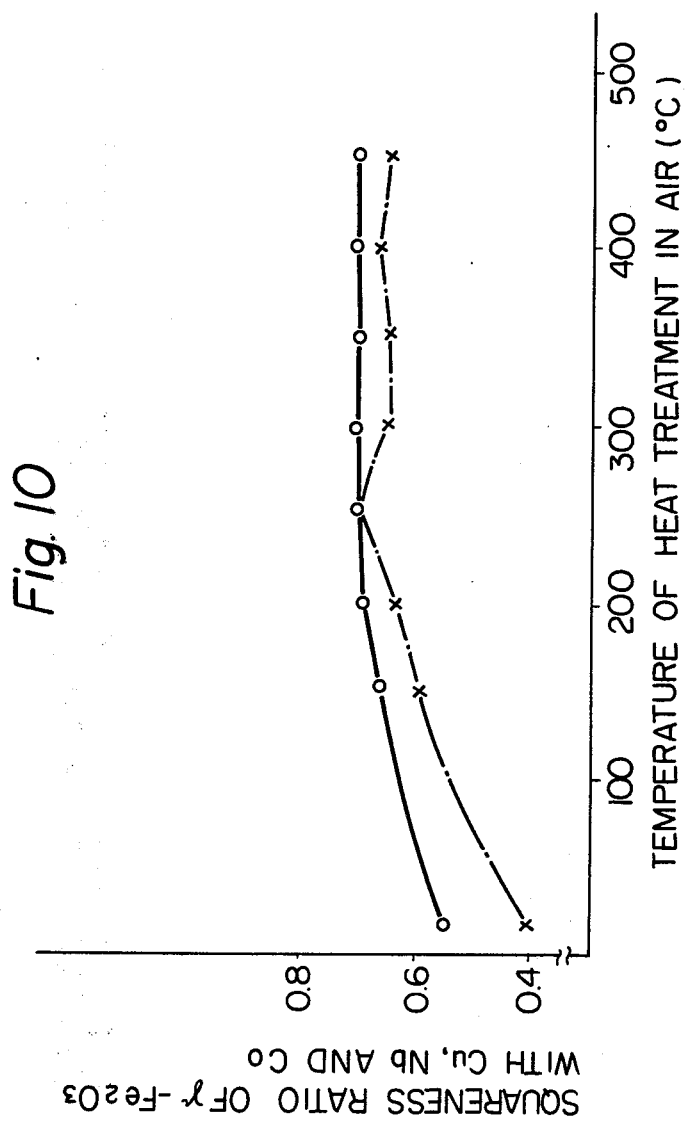

PROCESS FOR PRODUCING A MAGNETIC RECORDING MEDIUM

BACKGROUND OF THE INVENTION

1. Field of the Invention

The present invention relates to a process for producing a magnetic recording medium, particularly the magnetic recording medium using a thin film of ferrite, as well as the improved films of ferrite for to recording medium.

2. Description of the Prior Art

It is generally known that as a recording medium, in addition to the above-mentioned thin film of ferrite, a coating film of acicular crystalline particles of $\gamma$-$Fe_2O_3$ or an electrolytically deposited film of an Ni-Co alloy can also be used.

The coating film is polished in order to make the film thinner and to increase the recording density of the produced recording medium. However, it is considered quite difficult to further increase the recording density, because of the difficulty in making the film thinner by polishing and because of the fact that the $\gamma$-$Fe_2O_3$ crystals are dispersed in their binder.

The magnetic recording medium of the Ni-Co alloy can be easily provided in the form of a thin film. However, this alloy is corrosive and exhibits poor wear resistance. Therefore, it is necessary to apply a protective film with a thickness of 0.2 microns on the Ni-Co alloy, with the result being that the distance between a magnetic head and the recording medium is increased according to the added thickness of the protective film. Because of the increased distance between the magnetic head and the recording medium the area for memorizing a unit of information is widened, thereby making it difficult to perform highly densified recording.

The known thin film of ferrite is free from the above-described disadvantages and is far more superior in corrosion resistance and wear resistance than either the coating film or the electrolytically deposited film.

The term "a thin" film of ferrite herein used indicates a continuous film of the iron oxides of $Fe_3O_4$ or $\gamma$-$Fe_2O_3$, which oxides are crystallized directly on a substrate for supporting the recording medium, such as a disc, so that the crystals remain in a continuous state on the substrate, i.e., the crystals are not separated by a binder. The film of ferrite is generally produced by the following steps.

An $\alpha$-$Fe_2O_3$ is continuously formed by using any of the procedures of reaction sputtering, i.e., chemical sputtering, the coprecipitation method, the vapor growth method and the like. The $\alpha$-$Fe_2O_3$ is then reduced to $Fe_3O_4$, which is oxidized, if desired, to $\gamma$-$Fe_2O_3$. The $\alpha$-$Fe_2O_3$ can also be formed from $Fe(OH)_3$ or $Fe(OH)_2$, which is precipitated on the substrate. If the thin film of ferrite has a thickness of one micron or less, then this film can be produced without the polishing required for the coating film.

One of the problems residing in the known films of ferrite used as a recording medium is that it is difficult to stably reduce $\alpha$-$Fe_2O_3$ to $Fe_3O_4$, due to the narrow temperature range for the reduction. This reduction step is likely to bring about an excessive reduction of $\alpha$-$Fe_2O_3$ into a metallic iron.

Another problem residing in the known ferrites is that it is difficult to adjust the temperature for oxidizing the $Fe_3O_4$ to $\gamma$-$Fe_2O_3$ in order to provide the $\gamma$-$Fe_2O_3$ with excellent magnetic properties.

Still another problem residing in the films of ferrite is that their magnetic properties are less than the desirable properties of the highly densified recording medium. Namely, although properties exhibiting a coercive force (Hc) from 400 to 500 Oe and a squareness ratio of 0.5 or more are desired, the known ferrites exhibit only 300 Oe of coercive force and 0.4 squareness ratio.

SUMMARY OF THE INVENTION

It is, therefore, an object of the present invention to provide a process for producing a magnetic recording medium wherein the reduction from $\alpha$-$Fe_2O_3$ to $Fe_3O_4$ is performed within an increased temperature range.

Another object of the present invention is to provide such a reliable process for oxidizing the $Fe_3O_4$ to $\gamma$-$Fe_2O_3$, that excellent magnetic properties can be achieved over a wide range of oxidation temperature.

It is a further object of the present invention to provide a magnetic recording medium of ferrite which exhibits improved magnetic properties, such as coercive force and squareness ratio.

In accordance with the invention, there is provided a process for producing a magnetic recording medium, which consists of a thin film of ferrite, the process comprising the steps of:

forming a thin film of $\alpha$-$Fe_2O_3$, and reducing the thin film of $\alpha$-$Fe_2O_3$ to $Fe_3O_4$, characterized in that the $\alpha$-$Fe_2O_3$ contains copper in an amount of up to 15 atomic % of copper (atomic % being based on the number of both the iron atoms and the other metallic atoms incorporated within the film of the ferrite), and the reduction step is performed by heating the $\alpha$-$Fe_2O_3$ containing the copper in a reducing atmosphere at a temperature from 200° to 300° C.

Another process provided according to the invention includes an oxidation step for oxidizing the $Fe_3O_4$ containing Cu to $\gamma$-$Fe_2O_3$. This oxidation is performed at a temperature of from 150° to 400° C., preferably from 250 to 350° C. The oxidation atmosphere, like air, contains oxygen.

When the oxidizing temperature exceeds the maximum value of 400° C., the $\gamma$-$Fe_2O_3$ is changed to $\alpha$-$Fe_2O_3$.

In the above-mentioned processes, the iron oxides can include both Cu and Co in an amount of up to 15 atomic %. In the case wherein the iron oxides include both Cu and Co, the reducing and oxidizing temperatures therefor are not substantially different from the reducing and oxidizing temperatures for the iron oxides containing only Cu.

In accordance with the present invention, there is provided another process for producing a magnetic recording medium, which consists of a thin film of ferrite, said process comprising the steps of:

forming a thin film which consists of $\alpha$-$Fe_2O_3$;

reducing said thin film of $\alpha$-$Fe_2O_3$ to $Fe_3O_4$, and;

oxidizing said $Fe_3O_4$ to $\gamma$-$Fe_2O_3$, characterized in that said $\alpha$-$Fe_2O_3$ includes niobium in an amount up to 10 atomic percent, copper in an amount up to 15 atomic percent, and cobalt in an amount up to 6 atomic percent of and further said reduction step of said $\alpha$-$Fe_2O_3$ to said $Fe_3O_4$ is performed by heating said $\alpha$-$Fe_2O_3$ containing said niobium at a temperature of from 225° to 400° C., preferably from 225° to below 300° C., under an atmosphere containing a hydrogen gas.

It is preferable to form the $\alpha$-$Fe_2O_3$ film on anodically oxidized Al by reactive sputtering and then to reduce the $\alpha$-Fe$_2$O$_3$ film with hydrogen gas, which is saturated with water vapor due to bubbling of the hydrogen gas through water. This is because, the thus produced films of $\gamma$-Fe$_2$O$_3$ exhibit an excellent adhesion to the substrate, excellent wear resistance and excellent precision in the surface dimension of the film on the substrate. The reducing temperature below 300° C. is advantageous from the point of view of preventing distortion and cracking of the Al disc substrate. This Al substrate is liable to be distorted or cracked due to the difference in the thermal expansion coefficients between the different materials, i.e. Al and anodized film of the Al, when the reducing temperature is high.

In accordance with the present invention, there is provided a magnetic recording medium consisting of a thin film of ferrite, characterized in that the ferrite comprises a main component of Fe$_3$O$_4$ and additional components of copper and cobalt of up to 15 atomic %. Due to the addition of Co, this ferrite has a high coercive force of above 500 Oe, when the content of the additional components is up to 15 atomic %.

Also, in accordance with the present invention, there is provided a magnetic recording medium of a thin film of ferrite, characterized in that the ferrite comprises a main component of $\gamma$-Fe$_2$O$_3$ and additional components of copper up to 15 atomic % and cobalt of up to 6 atomic %. This ferrite is featured by having high coercive force of above 500 Oe and a high squareness ratio of above 0.6, when the content of the additional elements is preferably from 1 to 15%, more preferably from 1 to 10%. In the ferrites containing both Cu and Co, the minimum amounts of Cu and Co should be 1% and 1%, respectively. The maximum amount of Co should preferably be 6%, because a Co amount above 6% results in an extremely high coercive force which is higher than 2000 Oe, with the result being that a conventional magnetic head will not be able to read information written in a magnetic recording medium which exhibits such an unnecessarily high coercive force. The maximum amount of Cu should preferably be 15%, because of the possibility of an excessive reduction occurring to the iron oxide.

According to a preferred aspect of the additional components included in the Fe$_3$O$_4$ and $\gamma$-Fe$_2$O$_3$, these additional components consist of niobium in addition to the copper and cobalt. The content of the Nb in the ferrite is up to 10 atomic %, preferably from 2 to 5 atomic %; the content of Cu in the ferrite is up to 15 atomic %, preferably from 1 to 10 atomic %; and the content of Co in the ferrite is up to 6%, preferably from 1 to 3 atomic %. The Nb, which is added to the additional components according to the preferred aspect, increases the squareness ratio of the ferrite to 0.7 or more.

The copper, niobium and cobalt are believed to be present in the crystals of the iron oxides as either metallic ions in the state of solid solution, or as crystals of oxides in the state of mixed crystals with the iron oxides depending upon the content of copper and cobalt in the iron oxides.

The thin film of ferrite according to the present invention generally has a thickness of from 0.05 to 1 micron, preferably from 0.05 to 0.4 microns.

The magnetic recording device is generally produced by applying the recording medium of the invention on a substrate in the form of a disc. Furthermore, this device using the ferrite containing Cu possesses a recording density of from 200 to 800 bits per mm, and the device using the ferrite containing Cu and Co possesses a recording density of from 200 to 1000 bits per mm. The device using the ferrite containing Cu, Co and Nb possesses a recording density of from 200 to 1500 bits per mm.

BRIEF DESCRIPTION OF THE DRAWINGS

The invention is further illustrated with reference to FIGS. 1 through 11, wherein FIG. 1 is a schematic drawing showing a method for measuring the electrical resistance of a thin film;

FIG. 3 is a graph representing the dependence of both the coercive force and the squareness ratio upon the heat treatment temperature in air, with regard to ferrite which contains no Cu;

FIG. 6 is a graph representing the dependence of the squareness ratio (Br/Bs) of the $\gamma$-Fe$_2$O$_3$ containing Co and Cu upon the heat treatment temperature in air;

FIG. 7 is a graph representing the dependence of the coercive force of the $\gamma$-Fe$_2$O$_3$ containing Cu and Co upon the heat treatment temperature in air;

FIG. 9 is a graph which is similar to that of FIG. 7 and which represents the dependence with regard to the $\gamma$-Fe$_2$O$_3$ containing Cu, Nb and Co;

FIG. 10 is a graph which is similar to that of FIG. 6 and which represents the dependence with regard to the $\gamma$-Fe$_2$O$_3$ containing Cu, Nb and Co.

Figure 2:
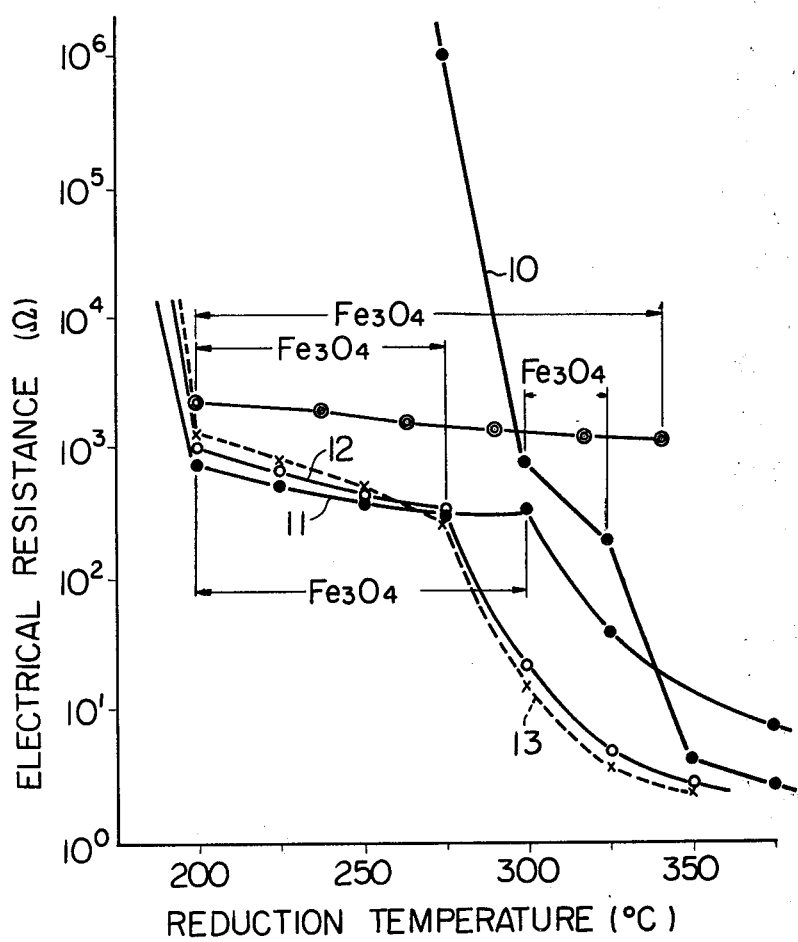
FIG. 2 is a graph representing the dependence of an electrical resistance of the film containing Cu upon a reducing temperature.

In several of the figures, the mark •——• indicates the respective maximum and minimum values of each property defined in each graph.

DETAILED DESCRIPTION OF THE INVENTION

The Fe$_3$O$_4$ film which contains Cu or both Cu and Co according to the present invention is characterized by the fact that Fe$_3$O$_4$ is produced by the reduction from $\alpha$-Fe$_2$O$_3$ to Fe$_3$O$_4$. The reducing temperature range for the $\alpha$-Fe$_2$O$_3$ with Cu is larger than the range for the $\alpha$-Fe$_2$O$_3$ without Cu.

The Fe$_3$O$_4$ film, which further contains Nb, is characterized by the fact that the range of the reducing temperature of the $\alpha$-Fe$_2$O$_3$ with Nb, Cu and Co is much greater than for the reduction temperature range of the $\alpha$-Fe$_2$O$_3$ with Cu and Co.

The thin films of Fe$_3$O$_4$ with or without the addition of Cu were produced by a process, which relied on the reactive sputtering and reduction. The sputtering was performed in an atmosphere comprising 80% of Ar and 20% of O$_2$. The iron was used as the target of sputtering and a film of $\alpha$-Fe$_2$O$_3$ was formed on an Al substrate up to a thickness of 1 micron.

The ferrites containing Cu were produced in the above-mentioned atmosphere by using iron targets containing 3, 5 and 15 atomic % of Cu. As a result, the $\alpha$-Fe$_2$O$_3$ films containing 3, 5 and 15 atomic % of Cu were respectively formed on the Al substrate up to a thickness of 1 micron or less.

Both the $\alpha$-$Fe_2O_3$ film and the $\alpha$-$Fe_2O_3$ film containing Nb were heated at several distinct temperature levels up to 400° C. over a period of one hour under a hydrogen gas atmosphere so as to reduce the $\alpha$-$Fe_2O_3$. The hydrogen gas was bubbled through water at room temperature prior to employment as the reducing gas. After the films were heat-treated, they were subjected to a measurement of the electric resistance thereof by a method referred to as the four-probe method, which is illustrated in FIG. 1.

In FIG. 1, the constant current source 3 was contacted with parts of a film 2 deposited on a substrate 1, in such a manner that probes 4 of the current source 3 are brought into a point of contact with the surface of the film 2 at a distance of 0.75 mm between the probes 4. The probes 4 consisted of a tungsten wire and were pressed against the film 2 by a spring force. A voltage meter 5 measuring voltage on the order of microvolts was similarly contacted with the film 2 through probes 6 thereof, so as to locate these probes 6 within the probes 4. The resistance value of the film 2 can therefore be determined by comparing a given value of the current with the measured voltage.

In addition to the measurement of resistance, a measurement of saturation magnetization and X-ray diffractography were performed to investigate the degree of reduction in the thin films.

The films of $\alpha$-$Fe_2O_3$ containing 5% of Nb, 5% of Cu and 2% of Co were produced by a procedure similar to that of the production of the $\alpha$-$Fe_2O_3$ containing only Cu, and were subjected to measurement of electric resistance. The results are illustrated in FIG. 2 by line -⊚-·

The relationship between the electric resistance and the reduction temperature is illustrated in FIG. 2, in which the reference numerals 10, 11, 12 and 13 indicate iron oxide films containing no Cu, 5%, 15% and 3% of Cu, respectively.

According to the measurement of saturation magnetization and X-ray diffractography, it was found that $\alpha$-$Fe_2O_3$ remained unreduced when the resistance value exceeded $10^3\omega$, while the $\alpha$-$Fe_2O_3$ was reduced to $Fe_3O_4$ at a resistance value ranging from $10^2$ to $10^3\omega$. The $\alpha$-$Fe_2O_3$ was however, excessively reduced to Fe, when the resistance value was decreased to $10^2\omega$ or less.

The following facts will therefore be clear from FIG. 2;

(1) The $\alpha$-$Fe_2O_3$ film containing no Cu (No. 10) can be reduced to $Fe_3O_4$ at a temperature range of from 300° to 325° C.;

(2) The $\alpha$-$Fe_2O_3$, which contains 3% and 15% of Cu (Nos. 13 and 12, respectively) can be reduced to $Fe_3O_4$ at a temperature range of from 200° to 270° C.;

(3) The $\alpha$-$Fe_2O_3$, which contains 5% of Cu (No. 11) can be reduced to $Fe_3O_4$ at a temperature range of from 200° to 300° C.

(4) The reducing temperature range is from 70° to 100° C. for the $\alpha$-$Fe_2O_3$ with Cu, and the reduction range for the $\alpha$-$Fe_2O_3$ without Cu is only 25° C.

(5) The $\alpha$-$Fe_2O_3$ containing 5% of Nb, 5% of Cu and 2% of Co can be reduced to $Fe_3O_4$ within a temperature range from 225° to 400° C. (Although the corresponding curve of FIG. 2 shows this property only to approximately 350° C. the experimental work has demonstrated this property for the full range here recited)

(6) The reducing temperature range for the $\alpha$-$Fe_2O_3$ with Nb, Cu and Co is far more increased than by the addition of only Cu.

The above illustrated advantageous effects of Nb and Cu were proved to be not further dependent upon the Nb content between 1 and 10% and the Cu content between 1 and 15% respectively. The addition of Co into the iron oxides has almost no influence upon the reduction characteristics of $\alpha$-$Fe_2O_3$ to $Fe_3O_4$. Due to the reducing temperature range being increased, according to the present invention, it is possible to stably produce $Fe_3O_4$ films without any danger of excessively reducing the $\alpha$-$Fe_2O_3$ to a metallic Fe. In addition to this feature, it should also be noted that the resistance value of the $Fe_3O_4$ with Cu does not change greatly within the range of the reducing temperature, and the resistance value varies from $5 \times 10^2$ to $10^3\omega$.

Furthermore, since the reducing temperature of $\alpha$-$Fe_2O_3$ is decreased compared with that of the ferrite without Cu, the substrate of the medium, which usually consist of Al, is not distorted during the reduction.

The film of ferrite should contain Cu in an amount not exceeding 15%, because the saturation magnetization is decreased as a result of the property of the Cu-ferrite and also as a result of the disappearance of the $Fe_3O_4$. The content of Cu in the ferrite should preferably be from 1 to 10%, more preferably from 2 to 5%, from view points of both the reduction temperature and the magnetic properties.

The $Fe_3O_4$ films containing 0 to 5% of Cu and produced by the above-mentioned process were further subjected to an oxidation of $Fe_3O_4$ to $\gamma$-$Fe_2O_3$ under a known condition, i.e., heating the $Fe_3O_4$ at a temperature of from 150° to 400° C. in the air. The thus treated films were subjected to a measurement of the coercive force and the squareness ratio.

Figure 4:
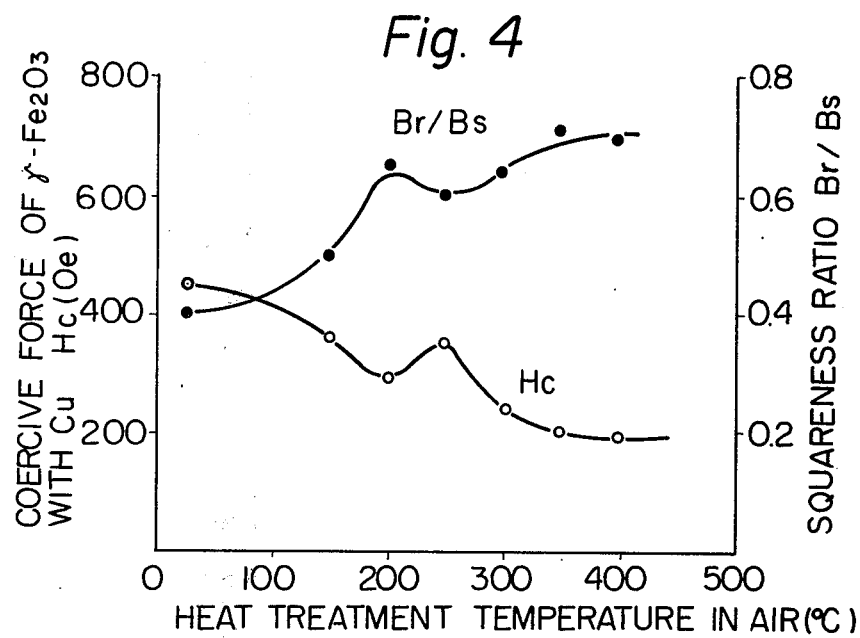
FIG. 4 is a graph which is similar to that of FIG. 3 with regard to ferrite containing Cu.

The relationship between the squareness ratio and the heat treatment temperature and the relationship between the coercive force and the heat treatment temperature are illustrated in FIG. 3 with regard to the $Fe_3O_4$ without Cu and in FIG. 4 with regard to the $Fe_3O_4$ with Cu.

As is clear from FIGS. 3 and 4, the squareness ratio (Br/Bs) of from 0.5 to 0.71 can be provided when the $\gamma$-$Fe_2O_3$ is formed by oxidation at a temperature of from 150° to 400° C., with regard to both the $\gamma$-$Fe_2O_3$ with and the $\gamma$-$Fe_2O_3$ without Cu. The influence of the Cu addition is apparent from a comparison of FIG. 3 with FIG. 4. Namely, the squareness ratio is slightly increased within the temperature range of from 150° to 400° C. preferably from 200° to 350° C., due to the Cu addition.

The films of the $Fe_3O_4$ and $\gamma$-$Fe_2O_3$ containing both Cu and Co have the coercive force increased by the addition of Co to the ferrite containing Cu, while the low reducing temperature and the increased range of the reduction temperature of the ferrite containing Cu remain unchanged by this addition of Co to the ferrite containing Cu.

Figure 5:
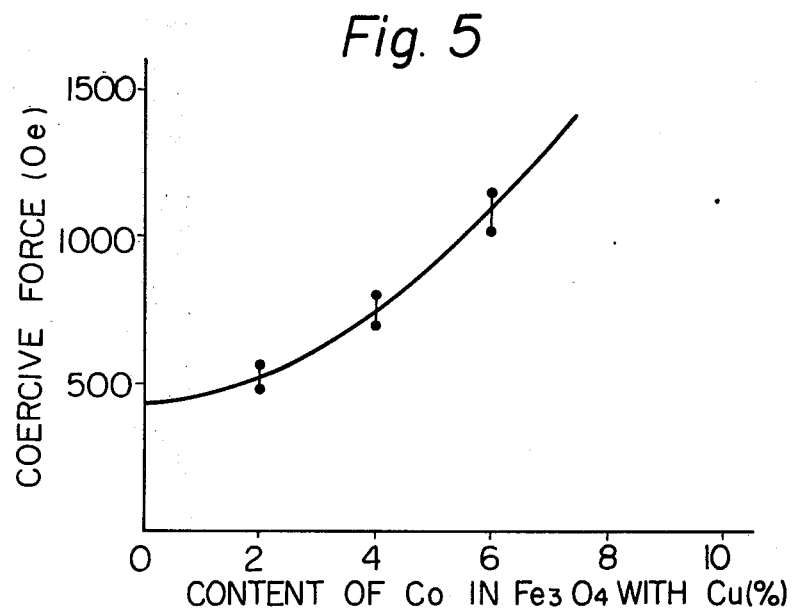
FIG. 5 is a graph representing the dependence of the coercive force (Hc) upon the content of Co in the Fe$_3$O$_4$ containing Cu.

The films of the $Fe_3O_4$ ferrite containing 5% of Cu and 2, 4 or 6% of Co were produced by a process, which is similar to that for the ferrite containing Cu. The relationship between the coercive force (Hc) and the Co content of the $Fe_3O_4$ is illustrated in FIG. 5. As is clear from this figure, the coercive force (Hc) increases with an increase in the Co content.

The films of $\gamma$-$Fe_2O_3$ containing both Cu and Co are featured by a high squareness ratio and a high coercive force, especially when the oxidation from $Fe_3O_4$ to $\gamma$-$Fe_2O_3$ is performed at a temperature of from 150° to 450° C., preferably from 200° to 350° C.

The relationship between the squareness ratio (Br/Bs) and the oxidation temperature of the $Fe_3O_4$ containing 5% of Cu and 2% of Co is illustrated in FIG. 6. As is clear from this figure, the squareness ratio of 0.65 to 0.80 is obtained at the oxidizing temperature of from approximately 170° C. to 400° C. The squareness ratio is extremely high at the temperature of from approximately 300° C. to 400° C.

The relationship between the coercive force and the oxidizing temperature of the $Fe_3O_4$ containing 5% of Cu and 2% of Co is illustrated in FIG. 7. As is clear from this figure, the coercive force is increased from 500 to 750 Oe when the oxidizing temperature is approximately from 150° C. to 400° C. The coercive force is extremely high when the temperature is approximately from 250° C. to 350° C.

Figure 8:
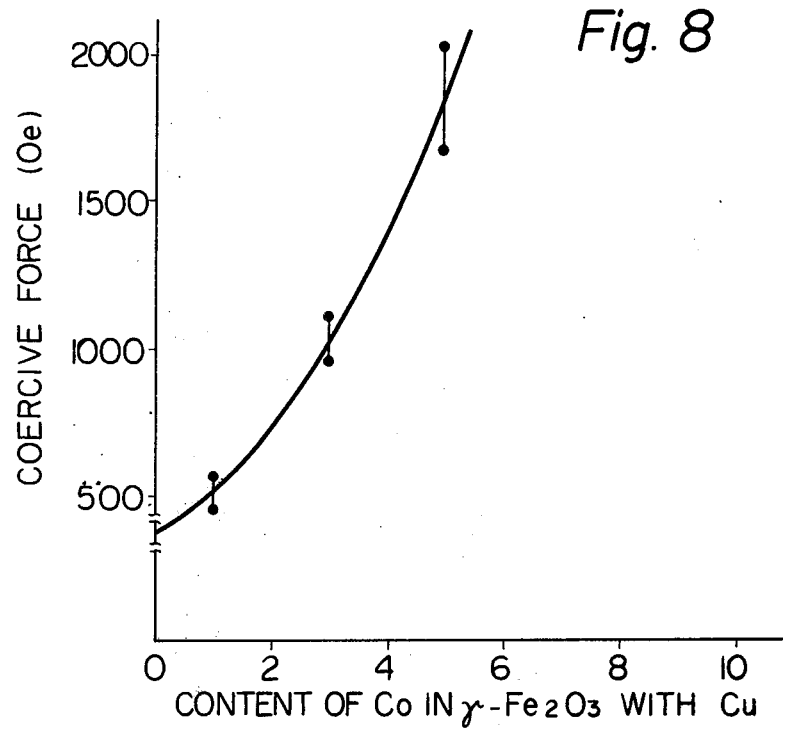
FIG. 8 is a graph representing the dependence of the coercive force of $\gamma$-Fe$_2$O$_3$ upon the Co content.

The films of $\gamma$-$Fe_2O_3$ containing 5% of Cu and up to 6% of Co were produced by the oxidation of $Fe_3O_4$ films at 300° C. The relationship between the added amount of Co and the coercive force is illustrated in FIG. 8. As is clear from this figure, the coercive force (Hc) is strongly increased with an increase in the addition of Co. When the content of Co exceeds 6%, the coercive force is higher than the required value necessary for writing the information in the magnetic recording medium by a commercially available magnetic head.

The $Fe_3O_4$ films containing 5 atomic % of Nb, 5 atomic % of Cu and 2 atomic % of Co were produced on a glass substrate by the above-mentioned process, which relied upon the reactive sputtering of $\alpha$-$Fe_2O_3$ and the reduction of the $\alpha$-$Fe_2O_3$. These $Fe_3O_4$ films were, further, subjected to oxidation to $\alpha$-$Fe_2O_3$ under the condition of heating the $Fe_3O_4$ at a temperature from 150° to 450° C. in the air. For comparison purposes, the $Fe_3O_4$ films not containing any Nb, Cu and Co were also subjected to the oxidation. All the films were then subjected to the measurement of the coercive force and the squareness ratio.

As is clear from FIG. 9, in which the coercive force is plotted, the coercive force of $\gamma$-$Fe_2O_3$ without the additional components (-x-) reached the peak maximum value within a considerably narrow range of the oxidation temperature. It is, extremely difficult to adjust the oxidizing temperature within this narrow range. Contrary to this, the $\gamma$-$Fe_2O_3$ with the additional components exhibits almost a constant value in the coercive force when the temperature range is from 150° to 450° C., particularly from 200° to 450° C. In addition, the coercive force of the $\gamma$-$Fe_2O_3$ with the additional components is higher than the coercive force of the $\gamma$-$Fe_2O_3$ without the additional components. It can be said, therefore, that the additional components of Cu, Nb and Co provide the $\gamma$-$Fe_2O_3$ with an excellent, stable magnetic property.

As is clear from FIG. 10, in which the squareness ratio is plotted, the additional components of Cu, Nb and Co exert the same influence on the squareness ratio as on the coercive force. The coercive force is high and constant when the temperature range is from 150° to 450° C., particularly from 200° to 450° C.

From the comparisons of FIG. 4, in which $Fe_3O_4$ with Cu is heat-treated, with FIGS. 9 and 10, in which $Fe_3O_4$ with Cu, Nb and Co is heat-treated, the functions of Nb and Co will be understood. Namely, the Nb and Co increase and stabilize the coercive force of the $\gamma$-$Fe_2O_3$ over a wide temperature range. Further, although a high squareness ratio of approximately 0.7 can be obtained only at 400° C. when the $\gamma$-$Fe_2O_3$ contains only Cu, the high squareness ratio of approximately 0.7 can be achieved over a wide temperature range, such as from 300 to 450° C., when the $\gamma$-$Fe_2O_3$ further contains Nb and Co, in addition to Cu.

Figure 11:
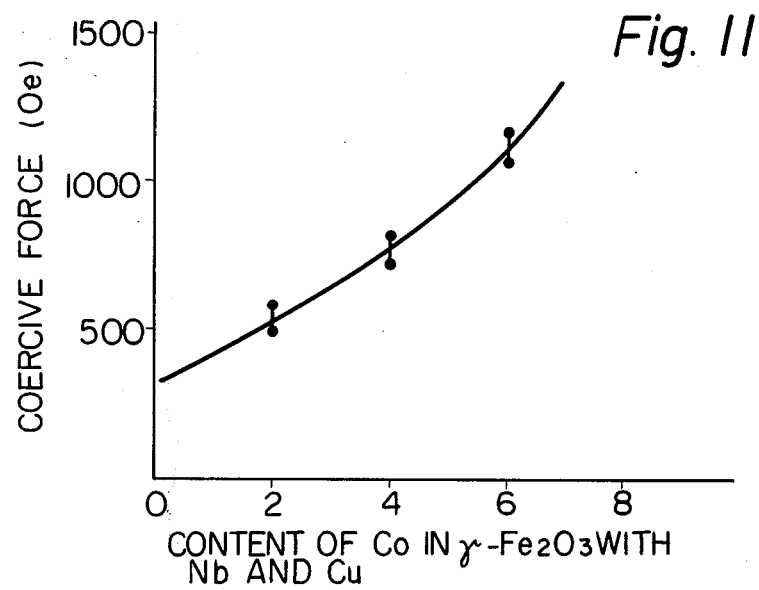
FIG. 11 is a graph which is similar to that of FIG. 5 and which represents the dependence with regard to the $\gamma$-Fe$_2$O$_3$ containing Cu, Nb and Co.

The $Fe_3O_4$ films containing 5 atomic % of Nb, 5 atomic % of Cu and up to 6 atomic % of Co were produced on a glass substrate by the above-mentioned process. $Fe_3O_4$ films produced by the reduction of the $\alpha$-$Fe_2O_3$ at 250° C. were, further, subjected to oxidation to $\gamma$-$Fe_2O_3$ under the condition of heating the $Fe_3O_4$ at a temperature of 300° C. in the air. The relationship between the coercive force (Hc) and the Co content is illustrated in FIG. 11. The coercive force increases with increase in the Co content, as seen in FIG. 11. The Co content should not exceed 6 atomic %, because the coercive force becomes unnecessarily higher than the required coercive force of the magnetic recording medium, which is suitable for use in combination with the presently available magnetic head.

Hereinafter, the present invention will be illustrated in more detail with reference to specific examples; however, these examples are not to be construed as examples which limit the scope of the invention.

First of all, for the purpose of making comparisons with the process of the invention, a comparative example was performed.

COMPARATIVE EXAMPLE

Sputtering was performed by using an Fe target containing no Cu under the condition of: a mixed-gas atmosphere 80% Ar and 20% of $O_2$. On an aluminum substrate, on which an anodically oxidized film was formed, films of $\alpha$-$Fe_2O_3$ were formed up to a thickness of 0.15 microns. The $\alpha$-$Fe_2O_3$ films were heated over a period of one hour at several distinct temperature levels of up to 400° C. in an atmosphere of humid hydrogen gas, which was bubbled through water prior to being used as the atmosphere gas. The electrical resistance of the films was measured to determine the degree of reduction of the films. It was proved that the $\alpha$-$Fe_2O_3$ films remained unreduced up to 300° C., that the $\alpha$-$Fe_2O_3$ films were reduced to $Fe_3O_4$ at a temperature of from 300° to 325° C., and that the $\alpha$-$Fe_2O_3$ films were further reduced to a metallic Fe at a temperature of over 325° C. The thus obtained $Fe_3O_4$ exhibited a coercive force (Hc) of 300 Oe and a squareness ratio (Br/Bs) of 0.4.

EXAMPLE 1

Sputtering was performed by using an Fe-target containing 5 atomic % of Cu under the condition of: a mixed-gas atmosphere 80% Ar and 20% of $O_2$. On an aluminum substrate, on which an anodically oxidized film was formed, films of $\alpha$-$Fe_2O_3$ with Cu were formed up to a thickness of 0.15 microns. The $\alpha$-$Fe_2O_3$ films were heated over a period of one hour at several distinct temperature levels of up to 400° C. in an atmosphere of humid hydrogen gas, which was bubbled through water prior to being used as the atmosphere gas. The electrical resistance of the films was measured to determine the degree of reduction of the films. It was proved that the $\alpha$-$Fe_2O_3$ films were reduced to $Fe_3O_4$ at temperature of from 200 to 300° Co, and further reduced to a metallic Fe at a temperature of over 300° C. The thus obtained $Fe_3O_4$ exhibited a coercive force (Hc) of 460 Oe and a squareness ratio (Br/Bs) of 0.41.

EXAMPLE 2

The $Fe_3O_4$ films obtained in Example 1 were heated at a temperature of 300° C. in air, and as a result, the $\gamma\text{-}Fe_2O_3$ films exhibiting a coercive force (Hc) of 240 Oe and an improved squareness ratio (Br/Bs) of 0.64 were formed.

EXAMPLE 3

The procedure of Example 1 was repeated, wherein the iron target contained a combination of additives of 5 atomic % of Cu and 2 atomic % of Co, and the $\gamma\text{-}Fe_2O_3$ was reduced at a temperature of 275° C. over a period of one hour. The thus obtained films of $Fe_3O_4$ exhibited a coercive force (Hc) of 500 Oe and a squareness ratio (Br/Bs) of 0.75.

EXAMPLE 4

The films of $Fe_3O_4$ obtained in Example 3 were heated to a temperature of 280° C. over a period of one hour, and as a result, films of $\gamma\text{-}Fe_2O_3$ exhibiting a coercive force (Hc) of 770 Oe and a squareness ratio (Br/Bs) of 0.75 were obtained.

EXAMPLE 5

The films of $Fe_3O_4$ containing 5% of Cu and 5% of Co were obtained by a process similar to that of Example 3 and exhibited a coercive force (Hc) of 900 Oe and a squareness ratio (Br/Bs) of 0.45.

EXAMPLE 6

The films of $Fe_3O_4$ obtained in Example 5 were heated to 300° C. over a period of one hour, and as a result, films of $\gamma\text{-}Fe_2O_3$ exhibiting a coercive force (Hc) of 1900 Oe and a squareness ratio (Br/Bs) of 0.80 were obtained.

EXAMPLE 7

The sputtering was performed using an Fe-target containing 5 atomic % of Nb, 5 atomic % of Cu and 2 atomic % of Co under the conditions of: a mixed-gas atmosphere of 80% of Ar and 20% of $O_2$. An $\alpha\text{-}Fe_2O_3$ film containing the above-mentioned percentages of Nb, Cu and Co was formed on an Al substrate, which was anodically oxidized to a thickness of three microns. The $\gamma\text{-}Fe_2O_3$ film had a thickness of 0.12 microns, as a result of the sputtering. This $\gamma\text{-}Fe_2O_3$ was reduced in an $H_2$ atmosphere to a temperature of 250° C. over a period of one hour, thereby obtaining $Fe_3O_4$, which also contained the above-mentioned percentages of Nb, Cu and Co.

The $Fe_3O_4$ film was heated to a temperature of 300° C., thereby producing the $\gamma\text{-}Fe_2O_3$.

The coercive force and the squareness ratio of the thus formed $\gamma\text{-}Fe_2O_3$ were 600 Oe and 0.7, respectively.

EXAMPLE 8

The procedure in Example 7 was repeated, except that the Fe-target contained 10% of Nb, 10% of Cu and 3% of Co.

The coercive force and the squareness ratio of the thus formed $\gamma\text{-}Fe_2O_3$ were 700 Oe and 0.6, respectively.

What we claimed is:

1. A process for producing a magnetic recording medium of a thin film of ferrite, said process comprising the steps of:
    forming a thin film of $\alpha\text{-}Fe_2O_3$ on a substrate, and
    reducing said thin film of $\alpha\text{-}Fe_3O_4$, characterized in that
    said thin film of $\alpha\text{-}Fe_2O_3$ is formed containing copper in an amount from 1 to 15 atomic % of copper, and said reduction step is performed by heating said $\alpha\text{-}Fe_2O_3$ containing said copper in a reducing atmosphere at a temperature of from 200° to 300° C.

2. A process according to claim 1, wherein said amount of copper is from 1 to 10 atomic %.

3. A process for producing a magnetic recording medium of a thin film of ferrite, said process comprising the steps of:
    forming a thin film of $\alpha\text{-}Fe_2O_3$ on a substrate,
    reducing said thin film of $\alpha\text{-}Fe_2O_3$, to $Fe_3O_4$, and
    oxidizing said $Fe_3O_4$ to $\gamma\text{-}Fe_2O_3$ characterized in that
    said film of $\alpha\text{-}Fe_2O_3$ is formed containing copper in an amount from 1 to 15 atomic %, said reduction step is performed by heating said $\alpha\text{-}Fe_2O_3$ containing said copper in a reducing atmosphere at a temperature of from 200° to 300° C., and said oxidizing step is performed by heating said thin film of $Fe_3O_4$ containing said copper at a temperature of from 150° to 400° C. in an atmosphere which contains oxygen.

4. A process according to claim 4, wherein said oxidizing temperature is from 250° to 350° C.

5. A process according to claim 4, wherein said amount of copper is from 1 to 10 atomic %.

6. A process for producing a magnetic recording medium of a thin film of ferrite, said process comprising the steps of:
    forming a thin film of $\alpha\text{-}Fe_2O_3$ on a substrate, and
    reducing said thin film of $\alpha\text{-}Fe_2O_3$ to $Fe_3O_4$, characterized in that
    said film of $\alpha\text{-}Fe_2O_3$ is formed containing copper from 1 to 15 atomic % and cobalt in an amount from 1 to 6 atomic %, and said reduction step is performed by heating said $\alpha\text{-}Fe_2O_3$ containing said copper and cobalt in a reducing atmosphere at a temperature of from 200° to 300° C.

7. A process according to claim 6, wherein said copper is contained in an amount of from 1 to 10 atomic %.

8. A process for producing a magnetic recording medium of a thin film of ferrite, said process comprising the steps of:
    forming a thin film of $\alpha\text{-}Fe_2O_3$ on a substrate,
    reducing said thin film of $\alpha\text{-}Fe_2O_3$ to $Fe_3O_4$, and
    oxidizing said $Fe_3O_4$ to $\alpha\text{-}Fe_2O_3$, characterized in that
    said film of $\alpha\text{-}Fe_2O_3$ is formed containing copper in an amount from 1 to 15 atomic % and cobalt in an amount from 1 to 6 atomic %, said reduction step is performed by heating said $\alpha\text{-}Fe_2O_3$ containing said copper and cobalt in a reducing atmosphere at a temperature of from 200° to 300° C., and said oxidizing step is performed by heating said thin film of $Fe_3O_4$ containing said copper and cobalt at a temperature of from 150° to 400° C. in an atmosphere which contains oxygen.

9. A process according to claim 8, wherein said copper is contained in an amount of from 1 to 10 atomic %.

10. A process according to claim 8, wherein said oxidizing temperature is from 250° to 350° C.

11. The process of claim 6 or 8 wherein said copper and cobalt are contained in said film of $\alpha Fe_2O_3$ in total amount of up to 15 atomic %.

12. A process for producing a magnetic recording medium of a thin film of ferrite, said process comprising the steps of:
forming a thin film of $\alpha$-$Fe_2O_3$ on a substrate, and, reducing said thin film of $\alpha$-$Fe_2O_3$ to $Fe_3O_4$, characterized in that
said film of $\alpha$-$Fe_2O_3$ is formed containing niobium in an amount from 1 to 10 atomic %, copper in an amount from 1 to 15 atomic % and cobalt in an amount from 1 to 6 atomic %, and further said reduction step of said $\alpha$-$Fe_2O_3$ to said $Fe_3O_4$ is performed by heating said $\alpha$-$Fe_2O_3$ containing said niobium, copper and cobalt in a reducing atmosphere at a temperature of from 225° to 400° C.

13. A process according to claim 12, wherein said niobium is contained in an amount from 2 to 5 atomic %, said copper is contained in an amount of from 1 to 10 atomic %, and said cobalt is contained in an amount from 1 to 3 atomic %.

14. A process for producing a magnetic recording medium of a thin film of ferrite, said process comprising the steps of:
forming a thin film of $\alpha$-$Fe_2O_3$ on a substrate;
reducing said thin film of $\alpha$-$Fe_2O_3$ to $Fe_3O_4$; and,
oxidizing said $Fe_3O_4$ to $\alpha$-$Fe_2O_3$, characterized in that
said film of $\alpha$-$Fe_2O_3$ is formed containing niobium in an amount from 1 to 10 atomic %, copper in an amount from 1 to 15 atomic % and cobalt from 1 to 6 atomic %, said reduction step of said $\alpha$-$Fe_2O_3$ to said $Fe_3O_4$ is performed by heating said $\alpha$-$Fe_2O_3$ containing said niobium, copper and cobalt at a temperature of from 225 to 400° C in a reducing atmosphere and said oxidation step is performed by heating said $Fe_3O_4$ containing said niobium, copper and cobalt to a temperature of from 150° to 450° C. in an atmosphere which contains oxygen.

15. A process according to claim 14, wherein said oxidation temperature is from 200° to 450° C.

16. A process according to claim 10, wherein said niobium is contained in an amount of from 2 to 4 atomic %, said copper is contained in an amount of from 1 to 15 atomic %, and said cobalt is contained in an amount of from 1 to 3 atomic %.

17. A process according to claim 16, wherein said oxidizing temperature is from 200° to 450° C.

18. A process for producing a magnetic recording medium of a thin film of ferrite, said process comprising the steps of:
forming on a substrate a thin film of $\alpha$-$Fe_2O_3$ containing copper in an amount from 1 to 15 atomic %, and
reducing said $\alpha$-$Fe_2O_3$ to $Fe_3O_4$ by heating said film in a reducing atmosphere at a temperature in a range broader than and extending lower than the range from 300° to 325° C.

19. The process of claim 18, wherein said amount of copper is from 3 to 15 atomic % and said reducing temperature range is between approximately 200° and 270° C.

20. The process of claim 18, wherein said amount of copper is approximately 5 atomic % and said reducing temperature range is between approximately 200° and 300° C.

21. The process of claim 18, wherein said amount of copper is from 2 to 5 atomic %.

22. A process for producing a magnetic recording medium of a thin film of ferrite, said process comprising the steps of
forming on a substrate a thin film of $\alpha$-$Fe_2O_3$ containing copper in an amount from 1 to 15 atomic %, and
reducing said thin film of $\alpha$-$Fe_2O_3$ to $Fe_3O_4$ by heating said $\alpha$-$Fe_2O_3$ containing said copper in a reducing atmosphere at a temperature in a range broader than and extending lower than the range from 300° to 325° C; and
oxidizing said $Fe_3O_4$ to $\alpha$-$Fe_2O_3$ by heating said thin film of $Fe_3O_4$ containing copper at a temperature of from 150 to 400° C. in an atmosphere which contains oxygen.

23. The process of claim 22, wherein said amount of copper is from 2 to 5 atomic %.

24. The process of claim 22, wherein said amount of copper if from 3 to 15 atomic % and said reducing temperature is between approximately 200° and 270° C.

25. The process of claim 22, wherein said amount of copper is approximately 5 atomic % and said reducing temperature is between approximately 200° and 300° C.

26. A process for producing a magnetic recording medium of a thin film of ferrite, said process comprising the steps of:
forming on a substrate a thin film of $\alpha$-$Fe_2O_3$ comprising copper in a mount from 1 to 15 atomic % and cobalt in amount from 1 to 6 atomic %; and
reducing said thin film of $\alpha$-$Fe_2O_3$ to $Fe_3O_4$ by heating said $\alpha$-$Fe_2O_3$ containing said copper and cobalt in a reducing atmosphere at a temperature in a range broader than and extending lower than the range from 300° to 325° C.

27. The process of claim 26, wherein said amount of copper is from 2 to 5 atomic %.

28. The process of claim 26, wherein said amount of copper is from 3 to 15 atomic % and said reducing temperature is between approximately 200° and 270° C.

29. The process of claim 26, wherein said amount of copper is approximately 5 atomic % and said reducing temperature is between approximately 200° and 300° C.

30. A process for producing a magnetic recording medium of a thin film of ferrite, said process comprising the steps of:
forming on a substrate a thin film of $\alpha$-$Fe_2O_3$ comprising copper in amount from 1 to 15 atomic % and cobalt in amount from 1 to 6 atomic %; and
reducing said thin film of $\alpha$-$Fe_2O_3$ to $Fe_3O_4$ by heating said $\alpha$-$Fe_2O_3$ containing said copper and cobalt in a reducing atmosphere at a temperature in a range broader than and extending lower than the range from 300 to 325° C; and
oxidizing said $Fe_3O_4$ to $\alpha$-$Fe_2O_3$ by heating said thin film of $Fe_3O_4$ containing said copper and cobalt at a temperature of from 150 to 400° C. in an atmosphere containing oxygen.

31. The process of claim 30, wherein the amount of said copper is from 2 to 5 atomic %.

32. The process of claim 30, wherein said amount of copper is from 3 to 15 atomic % and said reducing temperature is between approximately 200° and 270° C.

33. The process of claim 30, wherein said amount of copper is approximately 5 atomic % and said reducing temperature is between approximately 200° an 300° C.

34. The process of claim 26 or 30 wherein said copper and cobalt are contained in said film of $\alpha\text{-}Fe_2O_3$ in total amount up to 15 atomic %.

35. A process for producing a magnetic recording medium of a thin film of ferrite, said process comprising the steps of:
   forming on a substrate a thin film of $\alpha\text{-}Fe_2O_3$ containing niobium, copper and cobalt in amount from 1 to 10, 1 to 15 and 1 to 6 atomic %, respectively; and
   reducing said thin film of $\alpha\text{-}Fe_2O_3$ to $Fe_3O_4$ by heating in a reducing atmosphere at a temperature in a range broader than and extending lower than the range from 300° to 325° C.

36. The process of claim 35, wherein said amounts of niobium, copper and cobalt are approximately 5, 5 and 2 atomic %, respectively, and said reducing temperature is approximately from 225° to 400° C.

37. A process for producing a magnetic recording medium of a thin film ferrite, said process comprising the steps of:
   forming on a substrate a thin film of $\alpha\text{-}Fe_2O_3$ containing niobium, copper and cobalt in amount from 1 to 10, 1 to 15 and 1 to 6 atomic %, respectively;
   reducing said thin film of $\alpha\text{-}Fe_2O_3$ to $Fe_3O_4$ by heating said $\alpha\text{-}Fe_2O_3$ in a reducing atmosphere at a temperature in a range broader than and extending lower than the range from 300° to 325° C.; and
   oxidizing said $Fe_3O_4$ to $\alpha\text{-}Fe_2O_3$ by heating said $Fe_3O_4$ containing said niobium, copper and cobalt to a temperature of from 150° to 450° C. in an atmosphere containing oxygen.

38. The process of claim 37, wherein said amounts of niobium, copper and cobalt are approximately 5, 5 and 2 atomic %, respectively, and said reducing temperature range is approximatey from 225° to 400° C.

* * * * *

UNITED STATES PATENT AND TRADEMARK OFFICE
CERTIFICATE OF CORRECTION

PATENT NO. : 4,156,037
DATED : May 22, 1979
INVENTOR(S) : SEIZI HATTORI ET AL.

It is certified that error appears in the above-identified patent and that said Letters Patent are hereby corrected as shown below:

Col. 1, line 10, "to" should be --the--;

Col. 8, line 35, after "80%" add --of--;

Col. 9, line 68, "claimed" should be --claim--;

Col. 12, line 31, "a mount" should be --an amount--;

Col. 13, line 7, "containg" should be --containing--.

Signed and Sealed this

Twentieth Day of November 1979

[SEAL]

Attest:

RUTH C. MASON
Attesting Officer

LUTRELLE F. PARKER
Acting Commissioner of Patents and Trademarks